(12) United States Patent
Bedetti

(10) Patent No.: US 7,637,966 B2
(45) Date of Patent: Dec. 29, 2009

(54) FLUID BED GRANULATION PROCESS AND APPARATUS

(75) Inventor: Gianfranco Bedetti, Milan (IT)

(73) Assignee: Urea Casale S.A. (CH)

( * ) Notice: Subject to any disclaimer, the term of this patent is extended or adjusted under 35 U.S.C. 154(b) by 446 days.

(21) Appl. No.: 10/562,503

(22) PCT Filed: May 19, 2004

(86) PCT No.: PCT/EP2004/005375

§ 371 (c)(1),
(2), (4) Date: Dec. 23, 2005

(87) PCT Pub. No.: WO2005/002716

PCT Pub. Date: Jan. 13, 2005

(65) Prior Publication Data

US 2007/0020338 A1    Jan. 25, 2007

(30) Foreign Application Priority Data

Jun. 26, 2003    (EP)    ................................. 03014360

(51) Int. Cl.
*C11D 11/00* (2006.01)
(52) U.S. Cl. ................................................ 23/313 FB
(58) Field of Classification Search ..................... None
See application file for complete search history.

(56) References Cited

U.S. PATENT DOCUMENTS

| | | | | |
|---|---|---|---|---|
| 2,635,684 A | | 4/1953 | Joscelyne | |
| 3,012,331 A | * | 12/1961 | Oholm et al. .................. | 34/370 |
| 3,036,338 A | | 5/1962 | Nack | |
| 3,214,844 A | * | 11/1965 | Oates et al. .................... | 34/370 |
| 3,528,179 A | * | 9/1970 | Smith .......................... | 34/259 |
| 3,733,056 A | * | 5/1973 | Fong .......................... | 366/107 |
| 3,849,900 A | * | 11/1974 | Dale et al. .................... | 34/368 |
| 4,000,563 A | * | 1/1977 | Cubitt et al. .................. | 34/362 |
| 4,033,555 A | * | 7/1977 | Fong .......................... | 366/101 |
| 4,126,945 A | * | 11/1978 | Manser et al. ................ | 34/265 |
| 4,215,151 A | * | 7/1980 | Rios et al. .................... | 426/467 |
| 4,219,589 A | * | 8/1980 | Niks et al. .................... | 427/213 |
| 4,237,814 A | * | 12/1980 | Ormos et al. ................. | 118/24 |
| 4,305,210 A | * | 12/1981 | Christensen et al. .......... | 34/583 |
| 4,389,978 A | * | 6/1983 | Northcote .................... | 122/4 D |
| 4,419,834 A | * | 12/1983 | Scott .......................... | 34/580 |
| 4,787,152 A | * | 11/1988 | Mark .......................... | 34/369 |
| 4,885,848 A | * | 12/1989 | Christensen ................. | 34/582 |
| 4,946,653 A | | 8/1990 | Stopp et al. | |
| 4,980,106 A | * | 12/1990 | Vogel .......................... | 264/102 |
| 5,062,221 A | * | 11/1991 | Fazion .......................... | 34/204 |
| 5,131,172 A | * | 7/1992 | Stevenson et al. ............. | 34/231 |

(Continued)

FOREIGN PATENT DOCUMENTS

EP    1 312 410 A1    5/2003

(Continued)

*Primary Examiner*—Robert James Popovics
(74) *Attorney, Agent, or Firm*—Akerman Senterfitt

(57) ABSTRACT

A process for obtaining finished granules of a predetermined substance in a granulation fluid bed (F1) of the so-called vertical growth type, the bed being formed and maintained by a respective flow of fluidification air, comprises a transfer phase by falling of the finished granules in a pressurized space below the granulation bed and a recovery phase of the finished granules from the pressurized space.

2 Claims, 3 Drawing Sheets

U.S. PATENT DOCUMENTS

| | | | |
|---|---|---|---|
| 5,145,650 A * | 9/1992 | Huttlin | 422/143 |
| 5,161,315 A * | 11/1992 | Long | 34/580 |
| 5,213,820 A * | 5/1993 | Uhlemann et al. | 425/222 |
| 5,251,763 A * | 10/1993 | Morris | 209/136 |
| 5,316,128 A * | 5/1994 | Long | 198/530 |
| 5,357,688 A * | 10/1994 | Christensen | 34/369 |
| 5,388,704 A * | 2/1995 | Morris | 209/139.1 |
| 5,478,173 A * | 12/1995 | Lenhart | 406/88 |
| 5,549,423 A * | 8/1996 | Lenhart | 406/86 |
| 5,593,715 A * | 1/1997 | Christensen | 426/467 |
| 5,637,336 A * | 6/1997 | Kannenberg et al. | 426/231 |
| 5,651,191 A * | 7/1997 | Walunas et al. | 34/236 |
| 5,653,872 A * | 8/1997 | Cohan | 210/252 |
| 5,695,701 A * | 12/1997 | Funder et al. | 264/117 |
| 5,839,207 A * | 11/1998 | Christensen et al. | 34/369 |
| 6,042,307 A * | 3/2000 | Lenhart | 406/88 |
| 6,070,520 A * | 6/2000 | Kannenberg et al. | 99/468 |
| 2007/0020338 A1* | 1/2007 | Bedetti | 424/490 |

FOREIGN PATENT DOCUMENTS

EP          1491252 A1 * 12/2004

* cited by examiner

FLUID BED GRANULATION PROCESS AND APPARATUS

FIELD OF APPLICATION

In its most general aspect, the present invention refers to a fluid bed granulation process for obtaining finished granules of a predetermined substance, comprising a recovery phase of said finished granules from the granulation fluid bed.

In the rest of the description and in the subsequent claims, with the terms: "finished granules" we mean granules of the predetermined substance of a predetermined size or, in other words, having predetermined grain size.

The process of the present invention is particularly, but not exclusively recommended for the fluid bed granulation of substances like, for example, urea, ammonium nitrate, ammonium chloride and similar substances susceptible to being granulated.

The invention also refers to a granulation apparatus, used to carry out the aforementioned process.

PRIOR ART

As is known, in a fluid bed granulation process, the obtainment of granules of a predetermined substance takes place through continuous growth (in volume and in mass), of granule seeds of such a substance, continuously fed into a granulation space, in which a respective fluid bed is realized, at the same time as a flow of an appropriate growth substance.

Generally, the growth substance is of the same nature as the substance to be granulated and is in liquid form, suitable for wetting, adhering and solidifying on the seeds and on the growing granules which, together, constitute said fluid bed.

The growth of the granules continues until a predetermined grain size is obtained, after which the finished granules, thus obtained and possibly cooled, are recovered and sent for storage and/or packaging.

It is also known that the aforementioned granulation fluid bed (formed from seeds and growing granules) is realized and maintained through a considerable and controlled continuous flow of rising air, or another gaseous fluid, also known as fluidification air.

To obtain a good granulation result it is necessary that only the finished granules are recovered from the granulation fluid bed and extracted or at least discharged from the respective granulation space.

It is also known the requirement, dictated by commercial needs, of realizing and providing a fluid bed granulation process which ensures the obtainment of monodispersed finished granules, that is to say finished granules having a diameter within a tight predetermined range of dimensions.

For such a purpose, international patent application Wo 02/074427, of the same applicant, teaches a so-called vertical growth fluid bed granulation process. In a process of this type the growing granules cyclically follow, many times, trajectories similar to each other, planar and substantially circular, until they leave the granulation fluid bed through the base plate on which the fluid bed is realized, which in this case is equipped with a plurality of suitably sized slits, with their size being correlated (larger) with the diameter of the granules intended to be produced.

In particular, in such a process, as the granulation progresses the granules increase in size and weight, until the flow of fluidification air which crosses the aforementioned slits is no longer able to support them any further.

At this point the finished granules leave the granulation bed, "falling by gravity" in countercurrent to the fluidification flow, through said slits.

It should be noted that the fluidification air of the fluid bed, just like the slits crossed by said air, due to their function of "classifying" the granules, i.e. selecting the finished granules from all of the seeds and growing granules present in the fluid bed, are also called classification air and slits, respectively.

The finished and classified granules which leave the granulation fluid bed, in a process of the aforementioned type, pass into a collection space or zone, below the granulation bed, which is necessarily at a greater pressure than atmospheric pressure since it is engaged, i.e. crossed, by the substantial flow of fluidification air.

To be able to carry out the storage and packaging of the finished granules obtained and classified in the aforementioned way, they must be recovered from said collection space or zone, i.e. discharged and extracted from said pressurized space.

For such a purpose the prior art provides mechanical extractor systems, like for example a bucket elevator or noria, and other similar mechanical extractors, which, if used in cases like the one considered here, would provide a sealing engagement in a suitable granule-discharge opening formed, for example, in a wall that defines the collection space.

But the use of such extracting systems would predictably involve some drawbacks that aren't totally acceptable in the cost-effectiveness of the granulation process intended to be actuated.

Indeed, a continuous mechanical extraction, from a pressurized space, like the one considered above, to be able to ensure limited or at least controlled losses of air in the granule-collection space and therefore to ensure a satisfactory seal between extractor and respective granule-discharge opening, is constructively very complex to realize and requires burdensome and difficult maintenance operations.

A further drawback, linked to the mechanical manipulation of the finished and classified granules, consists of the danger of said granules undergoing a sort of grinding or crushing, with the formation of powders and with an even substantial reduction in yield of the entire productive cycle.

SUMMARY OF THE INVENTION

The technical problem underlying the present invention is that of devising and providing a granulation process for obtaining finished granules of a predetermined substance in a granulation fluid bed of the so-called vertical growth type, wherein said bed is formed and maintained by a respective flow of fluidification air, comprising a transfer phase by falling of said finished granules in a pressurized space below said granulation bed and a recovery phase of said granules from said pressurized space, wherein the recovery of the finished granules takes place in a way that is simple to carry out, reliable and which does not require a burdensome and difficult maintenance, and at the same time with functional characteristics such as to safeguard the grain size of said finished granules, and the integrity of the monodispersed finished granules thus produced.

This problem is solved, according to the invention, by a fluid bed granulation process of the type considered above, characterized in that said recovery phase comprises:

a) the formation in said pressurized space of a collection fluid bed of said finished granules, through at least part of said fluidification air; and b) extraction in continuous flow of said finished granules from said collection bed and from the respective pressurized space, placing the base plate of said collection bed in fluid communication with a well, outside said pressurized space, fed substantially upstream from the finished granules of said collection bed.

The advantages and the features of the granulation process according to the present invention will become clearer from the detailed description of an exemplificative embodiment thereof, made herein below with reference to the attached drawings, for indicative and non-limiting purposes.

DETAILED DESCRIPTION

Figure 1:
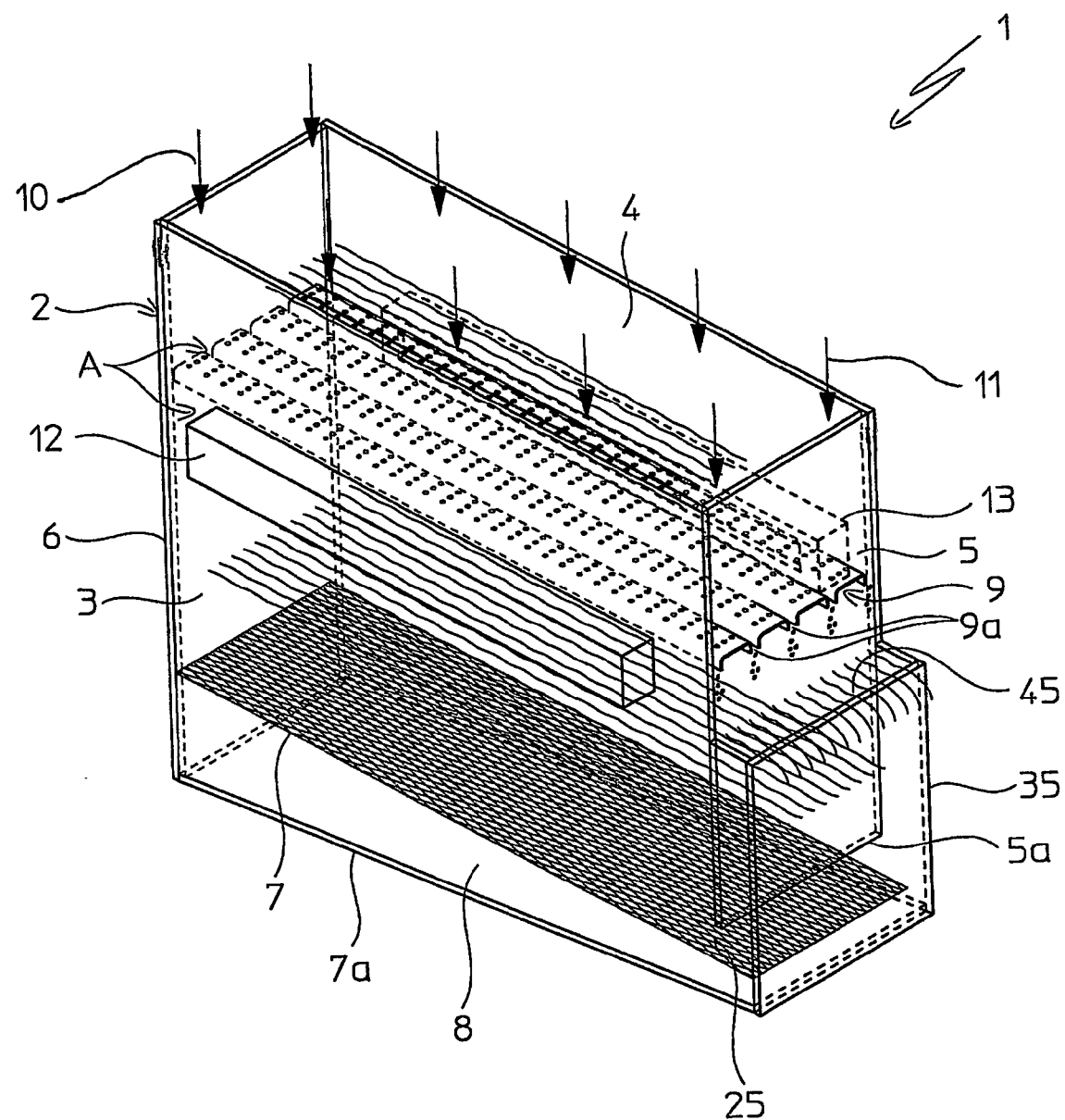
FIG. 1 schematically shows an axonometric view of an apparatus for carrying out the fluid bed granulation process according to the present invention.

With reference to the aforementioned figures, an apparatus for carrying out the process of the present invention is schematically indicated with 1.

Such an apparatus comprises a self-supporting structure 2, substantially in the shape of a parallelepiped container, which defines a space A inside it, in which two fluid beds F1 and F2 are intended to be realized, as can be seen more clearly in the rest of the description.

Said container structure 2 (which hereafter shall simply be called: container 2), has long side walls 3, 4, short front 5 and rear 6 walls; and, at the bottom, it is equipped with a double base plate, 7, 7a, upper and lower respectively.

In accordance with a characteristic of the present invention, the front wall 5, of said container 2, has the bottom side 5a, spaced from the base plate 7, of said double base plate, with which it thus defines a passage (or port) 25, which places the space A in communication with the outside of said container 2.

Moreover, in accordance with another characteristic of the present invention, the aforementioned base plates 7, 7a, extend from the rear wall 6, of the container 2, up to past said front wall 5, for a predetermined length portion.

At their free front ends, a vertical panel 35 is fixed to the base plates 7, 7a, preferably parallel to the wall 5, with which it defines a sort of duct or well 45, open at the top, extending for the whole width of said wall 5 and in communication with the space A, through the aforementioned passage 25.

The base plates 7, 7a of said double base plate, the rear wall 6 of the container 2 and the vertical panel 35, define a chamber 8 which is in fluid communication with the space A actually through said base plate 7, provided perforated, grated or in any case permeable to gas flows.

Said chamber 8, extending below the space A and the well 45, is of limited height and is intended to constitute a chamber for uniform distribution of a gaseous flow of fluidification air coming into said space A and into said well 45, as will better turn out from the following of the description.

Advantageously and in accordance with a further characteristic of the present invention, said distribution chamber 8 has a tapered profile starting from the rear wall 6, of the container 2, towards the vertical panel 35.

For such a purpose, the base plate 7a is provided tilted on the opposite base plate 7, and converging on it towards the aforementioned vertical panel 35.

Inside the container 2 and at a predetermined distance from its base plate 7 a rectangular shelf 9 is positioned, perimetrically fixed to the long side walls 3, 4, and to the short front and rear walls 5, 6, of said container 2.

Said shelf 9 defines, in said space A, a granulation zone B, and the granulation fluid bed F1 of a predetermined substance is intended to be realized on it. For such a purpose it is made permeable (for example it is perforated or grated) to the flow of fluidification air necessary for the formation and maintenance of said bed F1. Moreover, the aforementioned shelf 9 is equipped with a plurality of slits 9a, also known as classification slits since they are intended to allow the passage of the finished granules classified by the respective classification flow, as will better turn out from the following of the description.

For the aforementioned reason said slits 9a are suitably sized with a width correlated (larger) with the diameter of the granules intended to be produced.

In FIG. 1, arrows are represented with 10 and 11 which schematize the feeding (realized with per se known systems and, therefore, not represented) of granule seeds of the substance to be granulated, at the opposite side walls 3, 4 of the container 2 and for all of their length. While with 12 and 13 distributor-supplier devices of granule growth liquid substance are schematized, also known and therefore not represented in detail, arranged at said side walls 3 and 4 below the free surface of the granulation fluid bed (F1), also of the known type and therefore not represented in detail.

Figure 2:
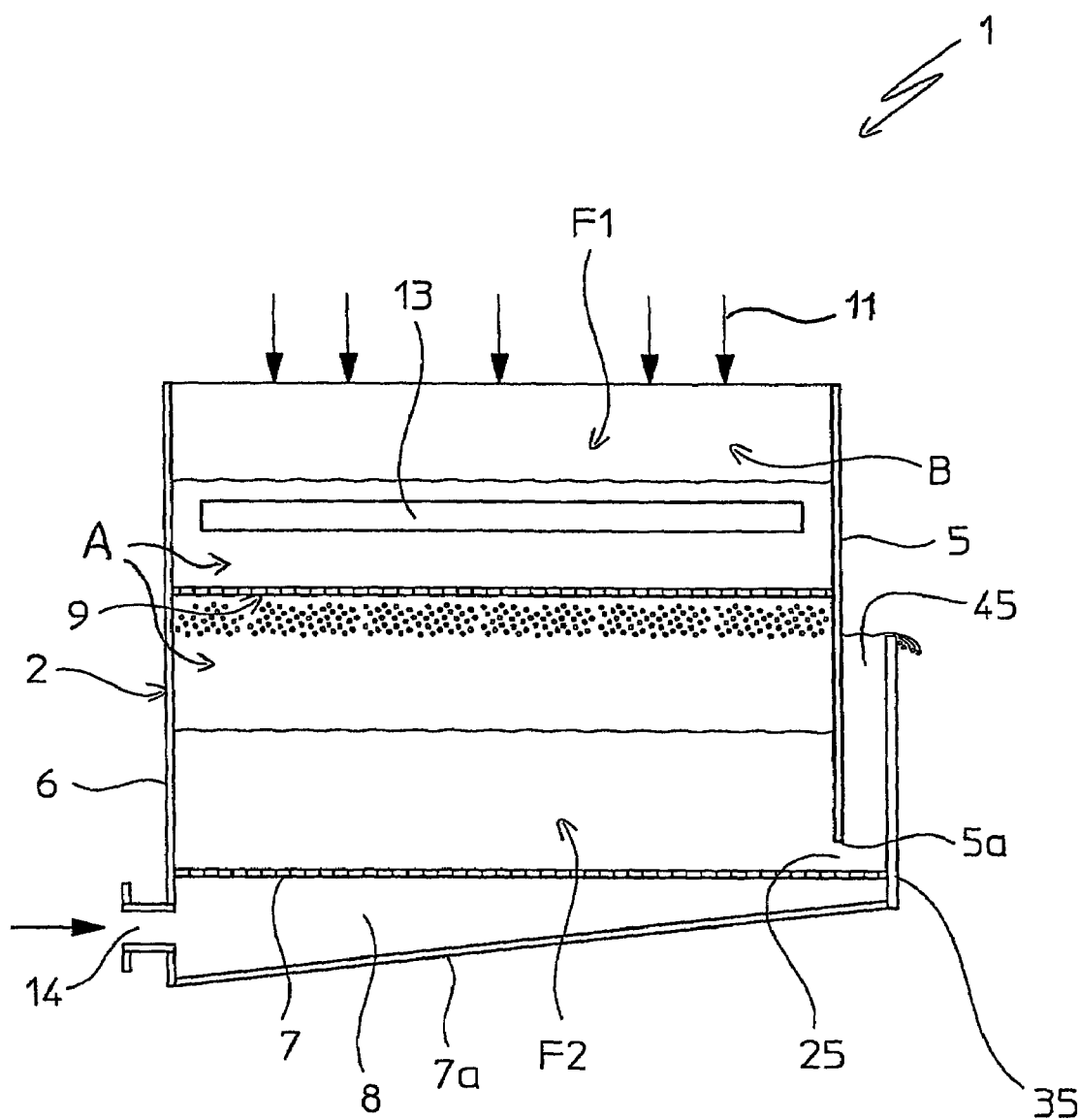
FIG. 2 schematically shows a section view of the apparatus of FIG. 1.

In FIG. 2, an opening is schematized with 14, associated with the rear wall 6, for the entry of air inside the chamber 8. Such opening 14 is in fluid communication with per se known and therefore not represented means, for blowing air into said chamber 19.

With reference to the apparatus of FIGS. 1 and 2, an embodiment of the granulation process of the present invention will now be described.

In a starting condition, on the shelf 9 a granulation fluid bed F1 is formed, consisting of granule seeds and growing granules. Said bed is obtained, supported and maintained through a continuous flow of fluidification air, fed into the chamber 8 and from here, through the base plate 7, into the space A, below said shelf 9.

When the granules in the granulation fluid bed reach a predetermined size and weight, hereafter called finished granules, the flow of fluidification air is no longer able to support them and they fall by gravity through the classification slits 9a.

At this point the finished granules thus obtained are affected by a transfer phase by falling of the finished granules themselves, and only by their falling, in a pressurized space, below the granulation bed F1.

In accordance with a characteristic of the present invention, said finished granules, and only these, form, in said pressurized space, a collection fluid bed F2 of said finished granules, realized and supported through the same flow of fluidification air of the fluid bed F1.

In accordance with a further characteristic of the present invention, the extraction of the finished and classified granules from said collection fluid bed F2, i.e. from said pressurized collection space, takes place substantially by hydraulic means, in continuous flow, since the collection space, and more precisely the base plate 7 of the bed F2 realized in said space, is in fluid communication with the well 45.

The well 45 and said collection space can be considered "communicating vessels", so that in the well 45 the level of the finished granules, i.e. the level of the fluid bed F2 in said well 45, stabilizes at a height (piezometric height) corresponding to the internal pressure present in the collection space, such as to counterbalance said internal pressure, so as to allow the continuous discharge of the finished granules, at the same time maintaining the pressure inside the collection space necessary for the operation of the upper granulation fluid bed (F1).

A further important advantage of the present invention, due to the use of a fluid bed for the collection and extraction of the finished granules from the granulation apparatus, in particular from the collection space for the finished granules where the pressure is of a greater value than atmospheric pressure, resides in the lowest or even inexistent mechanical stresses to which the finished granules are subjected, with a consequent guarantee of the safeguarding of the grain size and integrity of said finished and classified granules.

Said advantages, accomplished by the present invention, translate in a substantial energy saving and a substantial increase in yield of the entire productive cycle.

In particular, the extraction method of the finished granules from a pressurized space to outside the granulator is particularly simple to carry out, reliable even for long operating cycles and does not require particular maintenance interventions.

Of course, a man skilled in the art, in order to satisfy contingent and specific requirements, can make numerous modifications, all of which are in any case covered by the scope of protection of the invention as defined by the claims shown hereafter.

Figure 3:
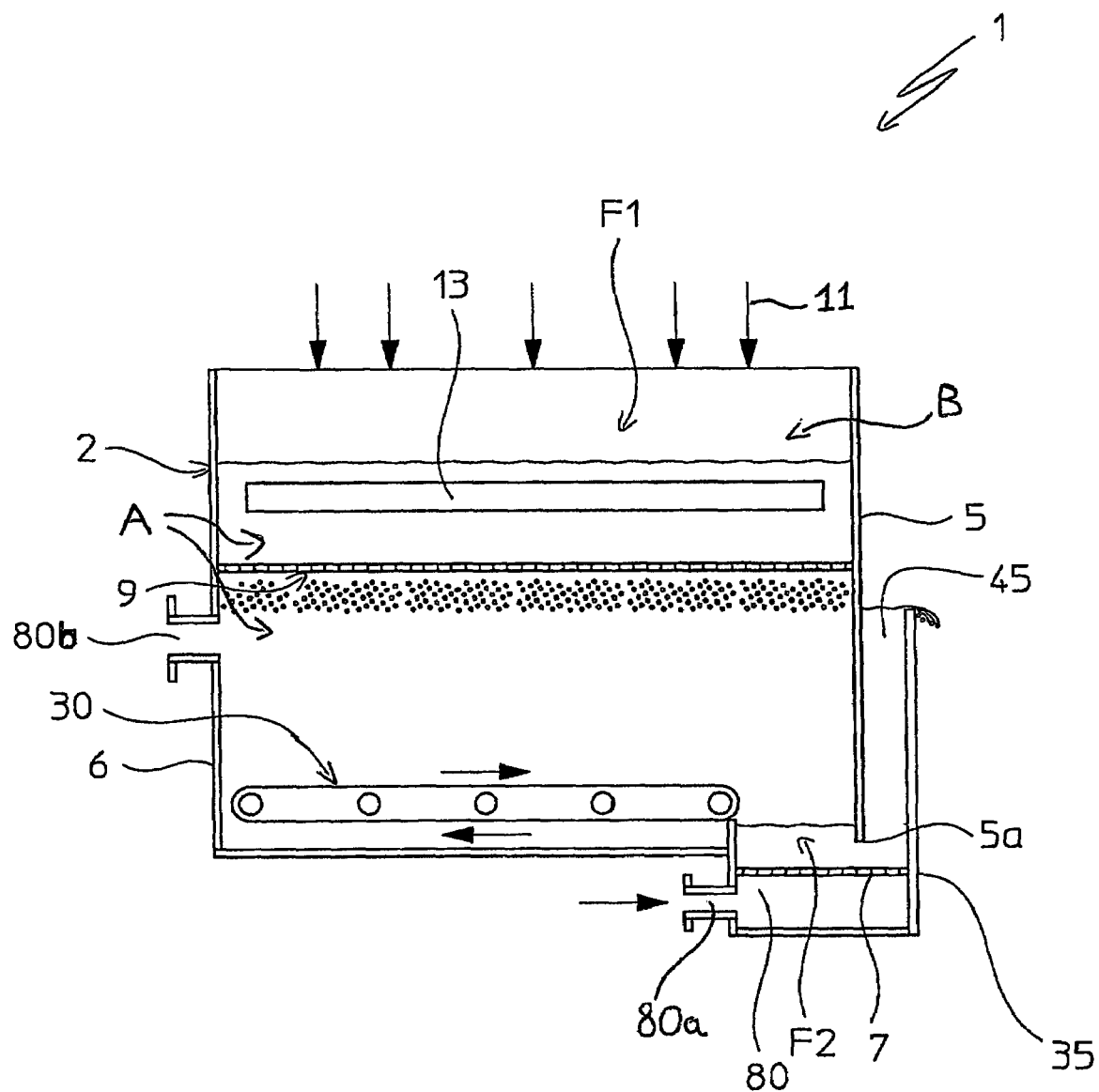
FIG. 3 is a schematic section view of a variant embodiment of the apparatus of FIG. 1.

Thus, for example, the granulation process according to the present invention shall now be described in a variant embodiment, carried out in a granulation apparatus shown in FIG. 3, where details and cooperating parts having the same structure and operation as the previous embodiment shall be indicated with the same reference numerals and symbols.

In such a variant embodiment a collection fluid bed (F2) for the finished and classified granules is realized, having a limited length with respect to what was previously described for the collection fluid bed, and said finished and classified granules, coming from the granulation fluid bed (F1), are fed to it through an appropriate transportation device 30, for example a chute, an endless conveyor belt and similar transportation systems, positioned in the collection space for said granules, under said shelf 9 in the container 2.

Said collection fluid bed (F2), in accordance with the present invention, extends in the well 45 and inside the pressurized space, beyond the front wall 5 of the container 2, by an appropriate predetermined portion of limited length.

In accordance with a further characteristic of the present invention, said fluid bed (F2) is fluidified through only part of the fluidification air of the granulation fluid bed (F1). In particular said part of fluidification air of the granulation fluid bed (F1) is distributed to the collection fluid bed (F2) through a base plate 7, permeable to gaseous flows, through a respective chamber 80, equipped with an opening 80*a* for feeding said fluidification air, extending below said bed (F2) and for the same said limited length.

The container 2, in order to feed the remaining part of fluidification air to the granulation fluid bed (F1), is equipped with an opening 80*b*, associated with the rear wall 6, below the shelf 9, for the entry of air inside the space A.

The openings 80*a* and 80*b* are in fluid communication with respective means, per se known and therefore not represented, for blowing air into said chamber 80 and into said space A, respectively.

According to a further variant embodiment of the present invention, the well 45 can be realized with a lower width with respect to the width of the corresponding front wall 5 of said container 2.

The invention claimed is:

1. A process for obtaining finished granules of a predetermined substance in a granulation fluid bed, said granulation fluid being formed and maintained by a respective flow of fluidification air, the process comprising the steps of:
   obtaining granules of said predetermined substance of a predetermined size by growing granule seeds in said granulation fluid bed in a flow of a growth substance;
   transferring finished granules of said predetermined size to a pressurized space below said granulation fluid bed by allowing said finished granules to fall through suitably sized opening in a base plate on which said granulation fluid bed is formed; and
   recovering said granules from said pressurized space,
   wherein said recovery step comprises:
   a) collecting said finished granules in said pressurized space in a collection fluid bed, said collection fluid bed being formed and maintained through at least part of said fluidification air; and
   b) extracting said finished granules in a continuous flow from said collection fluid bed to the outside of said pressurized space though a well arranged outside said pressurized space and in fluid communication with said collection fluid bed, fed with the finished granules of said collection fluid bed.

2. The process for obtaining finished granules of a predetermined substance according to claim 1, wherein all of the fluidification air of the granulation fluid bed is used for the fluidification of the collection fluid bed for the finished granules.

\* \* \* \* \*